(12) United States Patent
Sugiarto et al.

(10) Patent No.: US 7,992,381 B2
(45) Date of Patent: Aug. 9, 2011

(54) METHOD FOR IMPROVING REGENERATION OF A CATALYTIC DIESEL PARTICULATE FILTER

(75) Inventors: Tanto Sugiarto, West Lafayette, IN (US); John D. Williams, New Palestine, IN (US); Thomas M. Harris, Waterloo, IA (US)

(73) Assignee: Delphi Technologies, Inc., Troy, MI (US)

( * ) Notice: Subject to any disclaimer, the term of this patent is extended or adjusted under 35 U.S.C. 154(b) by 698 days.

(21) Appl. No.: 12/011,530

(22) Filed: Jan. 28, 2008

(65) Prior Publication Data

US 2009/0188241 A1 Jul. 30, 2009

(51) Int. Cl.
*F01N 3/00* (2006.01)
(52) U.S. Cl. ............... 60/295; 60/274; 60/276; 60/286
(58) Field of Classification Search .............. 60/274, 60/276, 286, 295, 311
See application file for complete search history.

(56) References Cited

U.S. PATENT DOCUMENTS

| 6,735,941 | B2 | | 5/2004 | Saito et al. | |
|---|---|---|---|---|---|
| 6,988,361 | B2 | * | 1/2006 | van Nieuwstadt et al. | 60/295 |
| 7,021,050 | B2 | * | 4/2006 | Nishimura et al. | 60/295 |
| 7,059,113 | B2 | * | 6/2006 | Hirota et al. | 60/277 |
| 7,121,083 | B2 | * | 10/2006 | Ishibashi et al. | 60/285 |
| 7,231,761 | B2 | | 6/2007 | Okugawa | |
| 7,500,358 | B2 | * | 3/2009 | Singh et al. | 60/295 |
| 7,533,524 | B2 | * | 5/2009 | Wang et al. | 60/297 |

* cited by examiner

*Primary Examiner* — Binh Q Tran
(74) *Attorney, Agent, or Firm* — Thomas N. Twomey

(57) ABSTRACT

A method for regeneration of a CDPF disposed in the exhaust stream of a diesel engine. The method includes a second phase operation following a first phase substantially as disclosed in the prior art. As the first phase ends, as indicated by a temperature sensor at the exit end of the CDPF, the temperature and oxygen content of the exhaust gas are increased at the entrance to the CDPF in an ensuing second stage. These increases cause oxidation of the soot remaining near the entrance and the sides of the CDPF, resulting in a cleaner and higher-capacity CDPF than is produced by a single-phase regeneration in the prior art. The sequential stages are implemented via an algorithm programmed into an Engine Control Module (ECM). A CDPF regenerated in accordance with the invention can have approximately 95% of its filtration capacity restored.

8 Claims, 6 Drawing Sheets

METHOD FOR IMPROVING REGENERATION OF A CATALYTIC DIESEL PARTICULATE FILTER

TECHNICAL FIELD

The present invention relates to exhaust emissions control systems for internal combustion engines; more particularly, to methods for regenerating a catalytic diesel particulate filter (CDPF) for exhaust gas in a diesel engine exhaust system; and most particularly, to a method for staging combustion in a CDPF during regeneration thereof to increase the thoroughness of regeneration while preventing thermal damage to the CDPF.

BACKGROUND OF THE INVENTION

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions because fuel is injected during the compression stroke as opposed to during the intake stroke in a spark-ignited engine. As a result, a diesel engine has less time for thorough mixing of the air and fuel before ignition occurs. For this and other reasons, diesel engine exhaust typically contains incompletely burned fuel known as particulate matter, or "soot".

It is known to use a catalytic particulate filter (CDPF) to trap soot particulates in diesel exhaust gas. During such use, a CDPF progressively loads up with accumulated soot and therefore must be regenerated at operating intervals by burning off the trapped particulates, typically on a fixed schedule and by oxygen and fuel enrichment of the exhaust stream entering the CDPF.

In a typical prior art regeneration, the inlet temperature to the CDPF is targeted to a certain predetermined value, for example, 600° C. The initial process may involve ramping of the CDPF temperature at various rates to prevent excessive combustion of wet soot (soot impregnated with unburned hydrocarbons) which is highly flammable and can cause an uncontrolled combustion that can damage a CDPF. Once the target temperature at the CDPF inlet is reached, that target temperature is maintained until the end of the allowed regeneration (single phase regeneration).

A well-known problem with such a prior art single-phase regeneration scheme is that significant amounts of soot may remain near the front and at the sides of the CDPF. Soot located at the front end tends to burn slowly during regeneration because of relatively low exhaust gas temperature at the CDPF inlet. On the other hand, soot farther along in the CDPF burns faster because of cumulative heat generated upstream. By the end of the designated regeneration period, the front and side portions of a CDPF typically are still covered in soot. This incomplete regeneration reduces the useful size and therefore the overall effectiveness of a CDPF.

What is needed in the art is an improved method for regenerating a CDPF that reduces the amount of soot remaining near the front end and sides of a CDPF after a regeneration procedure.

It is a principal object of the present invention to increase the degree of completeness of regeneration in a CDPF.

SUMMARY OF THE INVENTION

Briefly described, a method in accordance with the invention for regeneration of a CDPF disposed in the exhaust stream of a diesel engine includes a second phase operation following a first phase substantially as described above for the prior art. As the first phase ends, as indicated by a temperature sensor at the exit end of the CDPF, the temperature and oxygen content of the exhaust gas is increased at the entrance to the CDPF. These increases cause oxidation of the soot remaining near the entrance the sides of the CDPF, resulting in a cleaner and higher-capacity CDPF than is produced by a single-phase regeneration in the prior art. The two sequential phases are implemented via an algorithm programmed into an Engine Control Module (ECM).

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
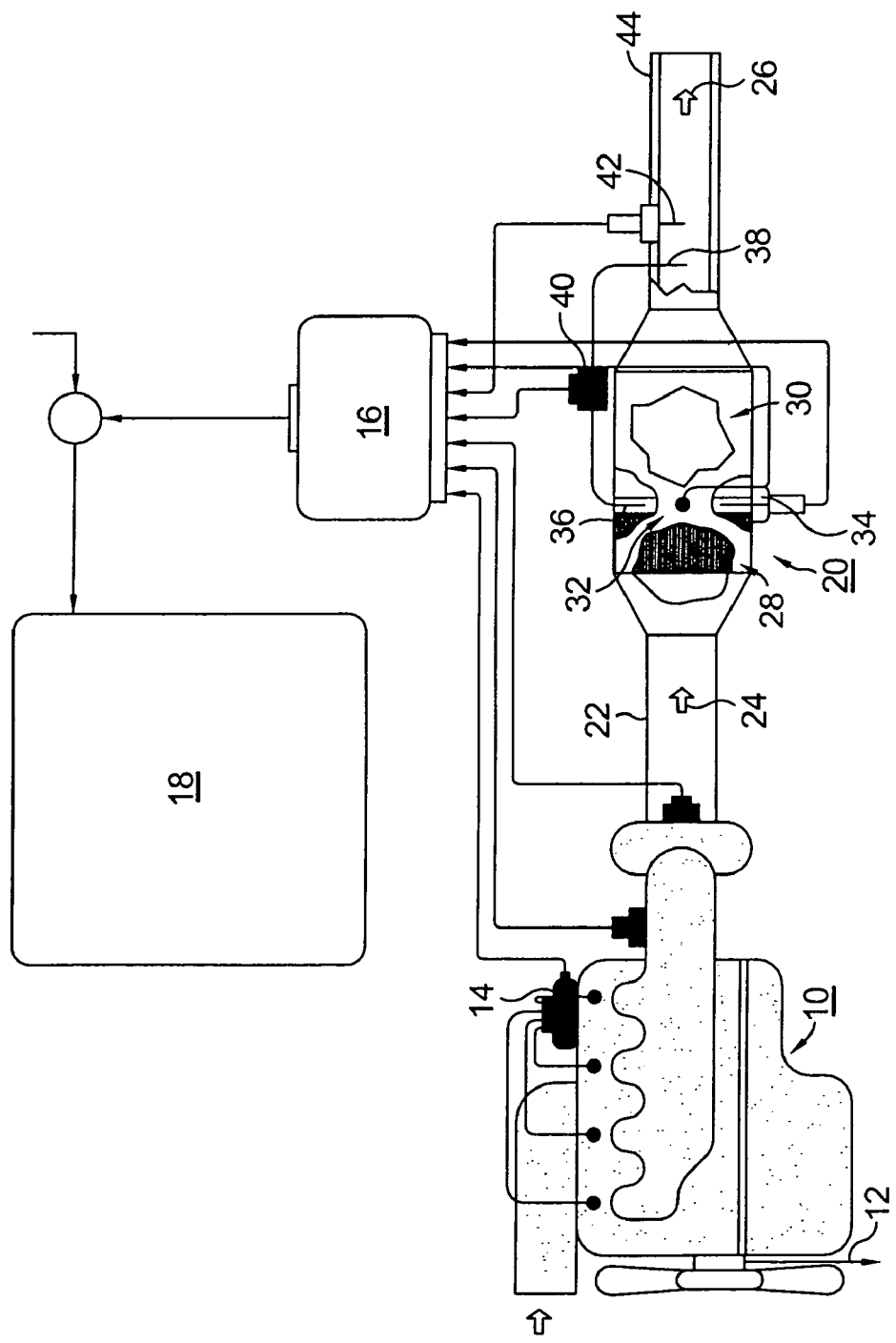
FIG. 1 is a schematic diagram of a prior art diesel engine and exhaust system including a CDPF and controls.

Referring to FIG. 1, a typical diesel engine and exhaust system is shown including a CDPF and controls in accordance with the prior art. It is an important advantage of a method in accordance with the present invention that the benefits thereof may be achieved for existing prior art systems and requires no changes or additions in hardware.

A diesel engine 10 is provided with a speed sensor means 12 and a fuel injection control valve 14 controlled by an Engine Control Module 16 that also monitors engine speed from speed sensor 12. ECM 16 is programmed with various engine control programs including an algorithm 18 (and see FIG. 5) for directing CDPF regeneration in accordance with a method of the present invention. A CDPF 20 is mounted in the exhaust pipe 22 for receiving engine exhaust gas 24 and discharging filtered exhaust gas 26. A diesel oxidation catalyst (DOC) 28 for catalyzing residual diesel fuel in the exhaust may be integral with the DPF 30 which has an oxygen sensor 32, an inlet temperature sensor 34, and an exhaust gas inlet pressure sensor 36 at the inlet thereof. An exhaust gas outlet pressure sensor 38 is summed with inlet pressure sensor 36 by a ΔP junction 40 to monitor pressure drop across CDPF 20. An outlet temperature sensor 42 is disposed in tailpipe 44.

Figure 2:
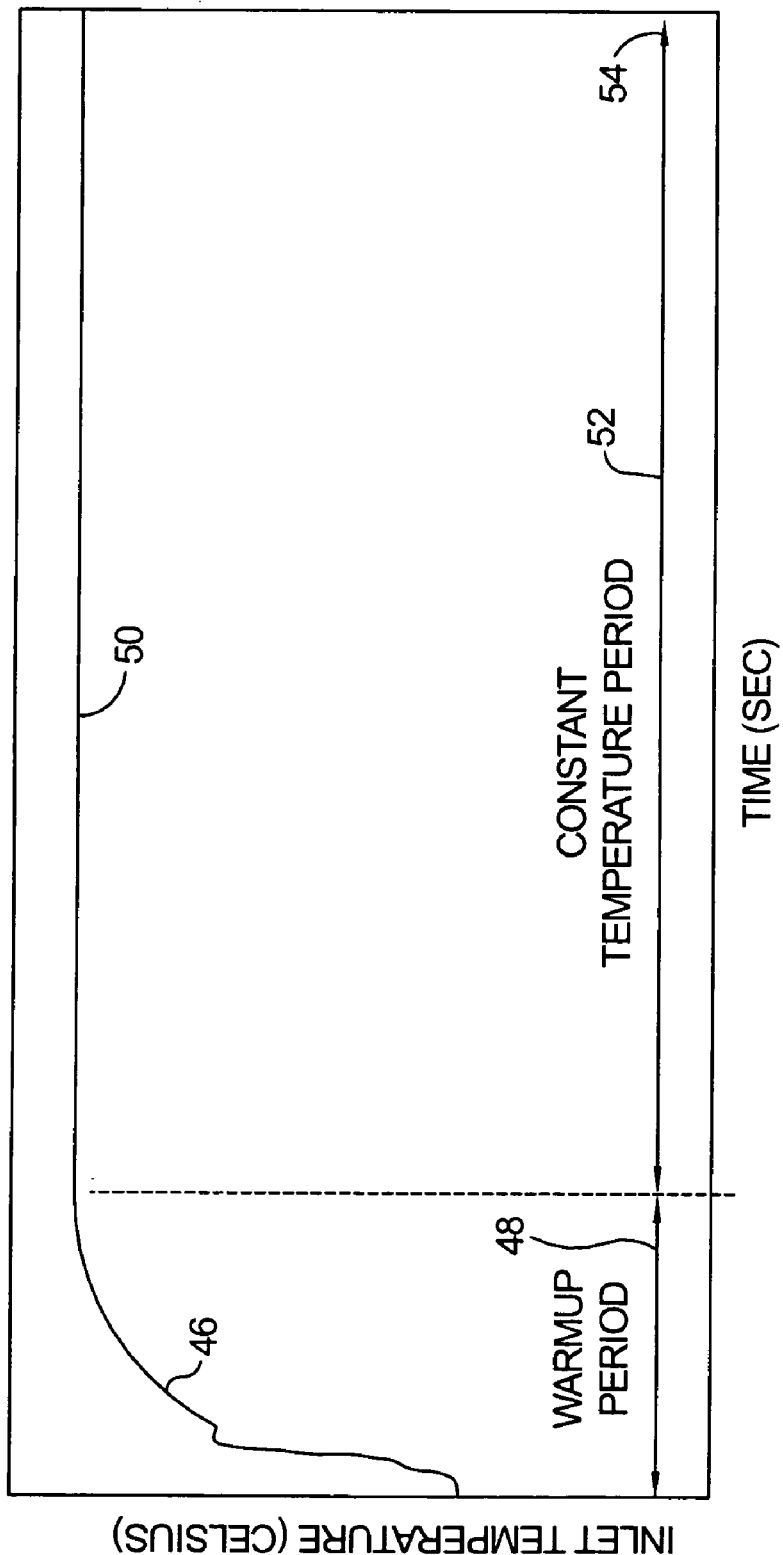
FIG. 2 is an exemplary graph showing CDPF inlet temperature as a function of time during a prior art single-phase regeneration procedure.

Referring to FIGS. 1 and 2, in a prior art single-phase regeneration procedure, excess fuel is injected into the exhaust stream and the oxygen content of the exhaust gas as sensed by sensor 32 is increased to a level sufficient to cause combustion of accumulated soot to begin at the inlet to DPF 30, causing a rise 46 in inlet temperature. After a warm-up period 48 of predetermined length, the oxygen and fuel content of the exhaust gas is controlled to provide a constant inlet temperature 50 over a second period 52 of predetermined length, after which the oxygen content is returned to nominal and the single-phase procedure is ended 54.

Figure 3:
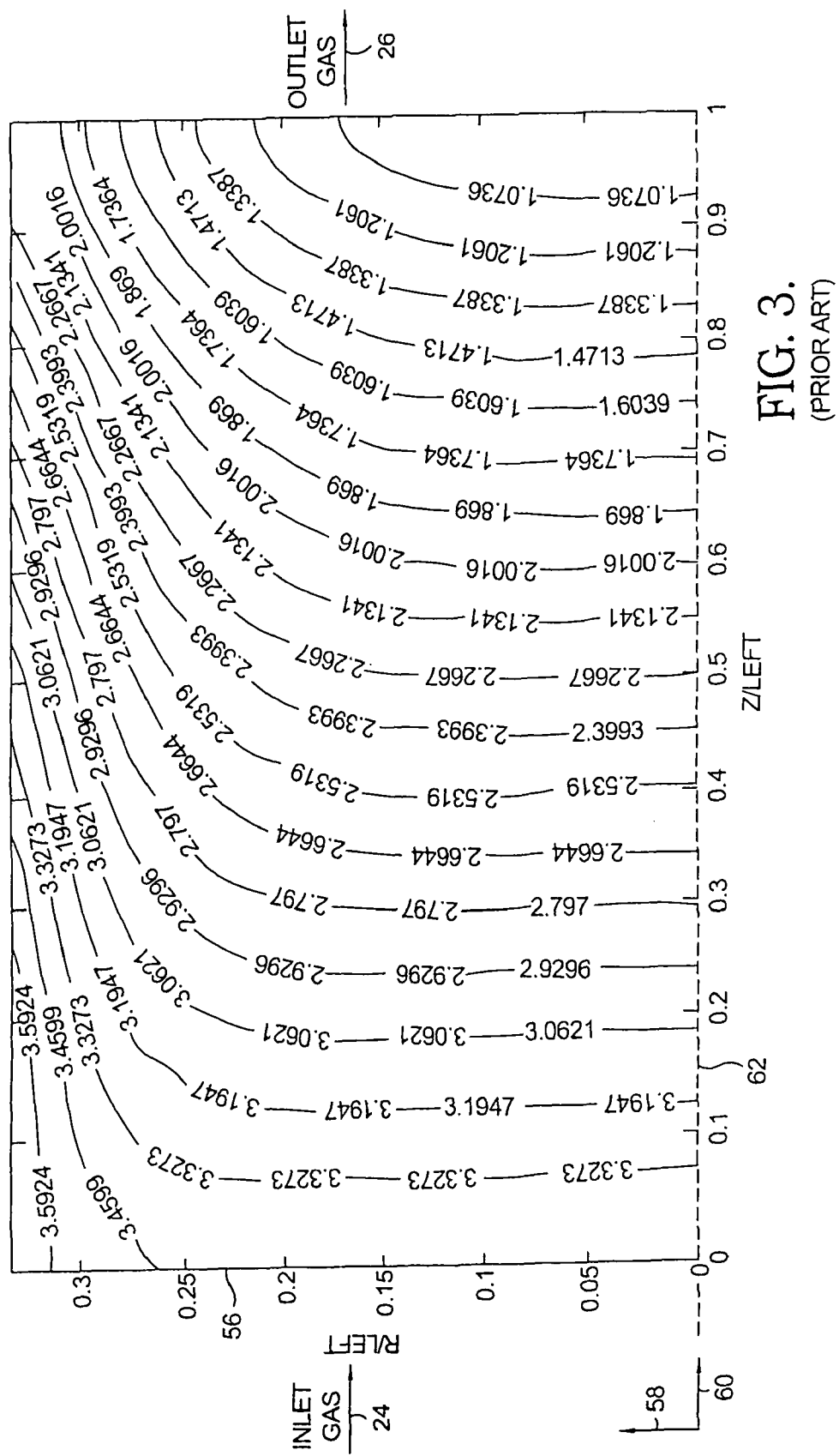
FIG. 3 is a schematic diagram showing residual soot, in grams/meter$^2$, both radially and longitudinally, in a CDPF after a prior art single-phase regeneration procedure.

Referring to FIG. 3, the vertical axis 56 represents the radial direction 58 from longitudinal direction 60 of the DFP which is the horizontal axis 62. The lines on the graph are lines of constant residual soot, expressed in grams/meter$^2$ of adsorption surface, following a typical prior art single-phase regeneration procedure. It is seen that this procedure removes only about ⅔ of the soot present along the axis of the DPF and less than ½ along the edges thereof. Thus, about 40% of the initial soot load remains. Since this soot is never removed by any subsequent regeneration cycle, the effective capacity of the DPF is about 40% less than the design capacity.

Figure 4:
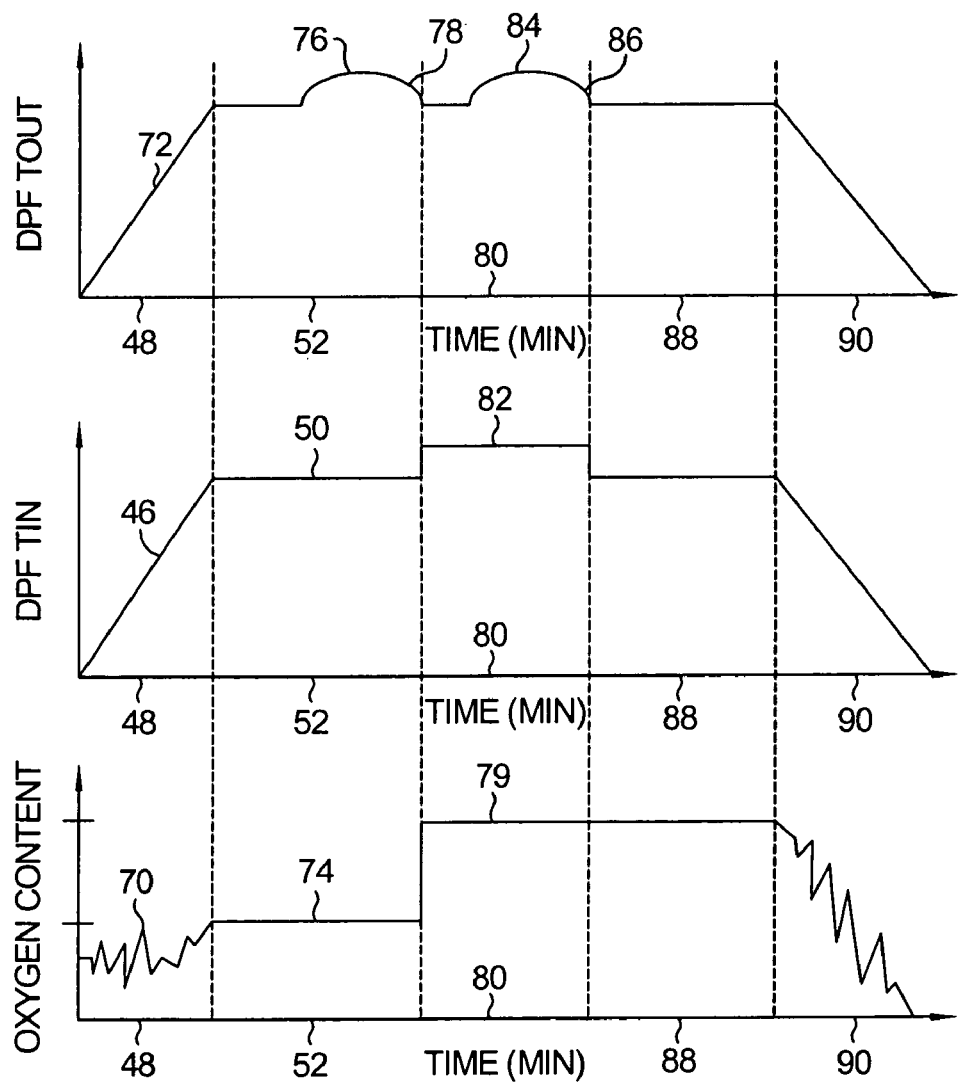
FIG. 4 is a set of three schematic graphs showing CDPF outlet temperature, CDPF inlet temperature, and exhaust gas oxygen content, as a function of time during a two-phase regeneration procedure in accordance with the invention.

Referring to FIG. 4, an improved two-phase regeneration procedure in accordance with the invention will now be described.

The ECM monitors the various engine exhaust parameters shown in FIG. 1 and determines when a regeneration event is to occur, typically by engine operating time from the end of the previous regeneration event although other triggers can be employed within the scope of the present invention, such as inferred soot load and/or increased ΔP.

Phase one of the improved regeneration procedure is substantially as recited above. Additional oxygen 70 and fuel are added to the exhaust stream to incite soot combustion at the inlet to the DPF.

During a warm-up period 48 (FIG. 2), DPF inlet temperature 46 gradually increases, and DPF outlet temperature 72 also gradually increases as combustion of soot begins near the DPF inlet.

During the following steady-state period 52 (FIG. 2), the inlet temperature 50 and the oxygen content 74 remain substantially constant by management of air management actuators (not shown) and PID fuel control. During this period, the controller monitors the inlet and outlet temperature sensors 34,38 (FIG. 1) for a temperature rise within the DPF that is characteristic of the primary soot oxidation occurring within the DPF. As this stage progresses, oxidation is virtually extinguished at the DPF inlet by the continuing flow of diesel exhaust gas which tends to be relatively cool; but combustion proceeds rapidly and substantially auto-catalytically within the central and later portions of the DPF, resulting in an outlet temperature rise 76. Combustion within the DPF is controlled by managing the fuel and oxygen additions to protect DPF 30 and DOC 28 from thermal damage while utilizing the heat of release of the oxidizing soot to maintain the regeneration cycle. A decrease 78 in outlet temperature is a signal that prior art phase one is coming to an end.

Upon completion of phase one, ECM 16 recognizes temperature decrease 78 and in phase two applies additional post-injection fuel and increases 79 inlet temperature and oxygen availability to DOC 28 and DPF 30 during a third time period 80 to more fully oxidize the soot that tends to remain in the DPF, as shown in FIG. 3. Such secondary combustion causes an increase 82 in the temperature sensed at the inlet. Upon recognition of the second characteristic outlet temperature increase 84 caused by light-off of the remaining soot, ECM 16 again manages fuel and oxygen additions to protect DPF 30 and DOC 28 from thermal damage while utilizing the heat of release of the oxidizing soot to maintain the second-phase regeneration cycle.

As in the first phase, a decrease 86 in post-DPF temperature signals a change in second phase regeneration. Once the ECM recognizes the end of the intense portion of the second phase regeneration, the system maintains the normal regeneration temperature values for an additional period of time 88 to complete the regeneration process and maximize the amount of soot combusted. In a cool-down period 90, flow of additional oxygen and fuel is terminated and engine management controls are driven to their normal states.

Figure 5:
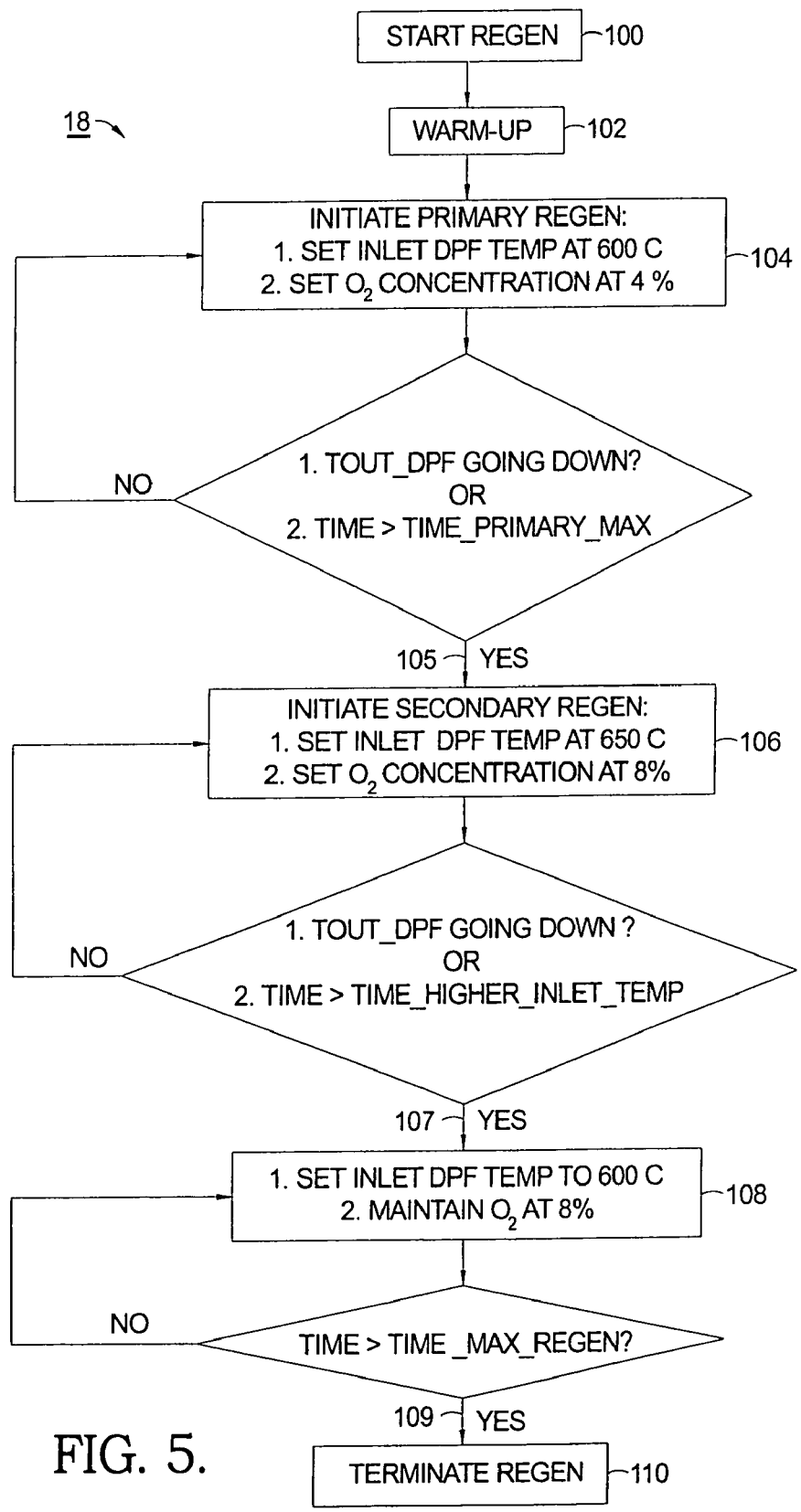
FIG. 5 is an algorithm showing logic and steps for performing a two-phase regeneration procedure in accordance with the invention.

Referring to FIG. 5, exemplary algorithm 18 carries out two-phase regeneration in accordance with a method of the present invention as follows.

When a regeneration event 100 is commanded, as described above, the system proceeds through a warm-up phase 102 and then initiates a primary regeneration sequence 104. The inlet temperature aim is controlled at 600° C. and the oxygen concentration in the exhaust gas is set at 4%. These conditions are maintained until the outlet temperature begins to decrease (78 in FIG. 4) or until 105 a calculated time limit is exceeded. A secondary regeneration sequence 106 is then initiated. The inlet temperature aim is increased to 650° C. and the exhaust oxygen content is raised to 8%. These conditions are maintained again until the outlet temperature begins to decrease (86 in FIG. 4) or until 107 a calculated time limit is exceeded. Then the secondary regeneration sequence is maintained 108 wherein the inlet temperature is reduced to 600° C. while maintaining the oxygen content at 8% until 109 a calculated time limit is exceeded, whereupon the entire regeneration sequence is terminated 110.

Figure 6:
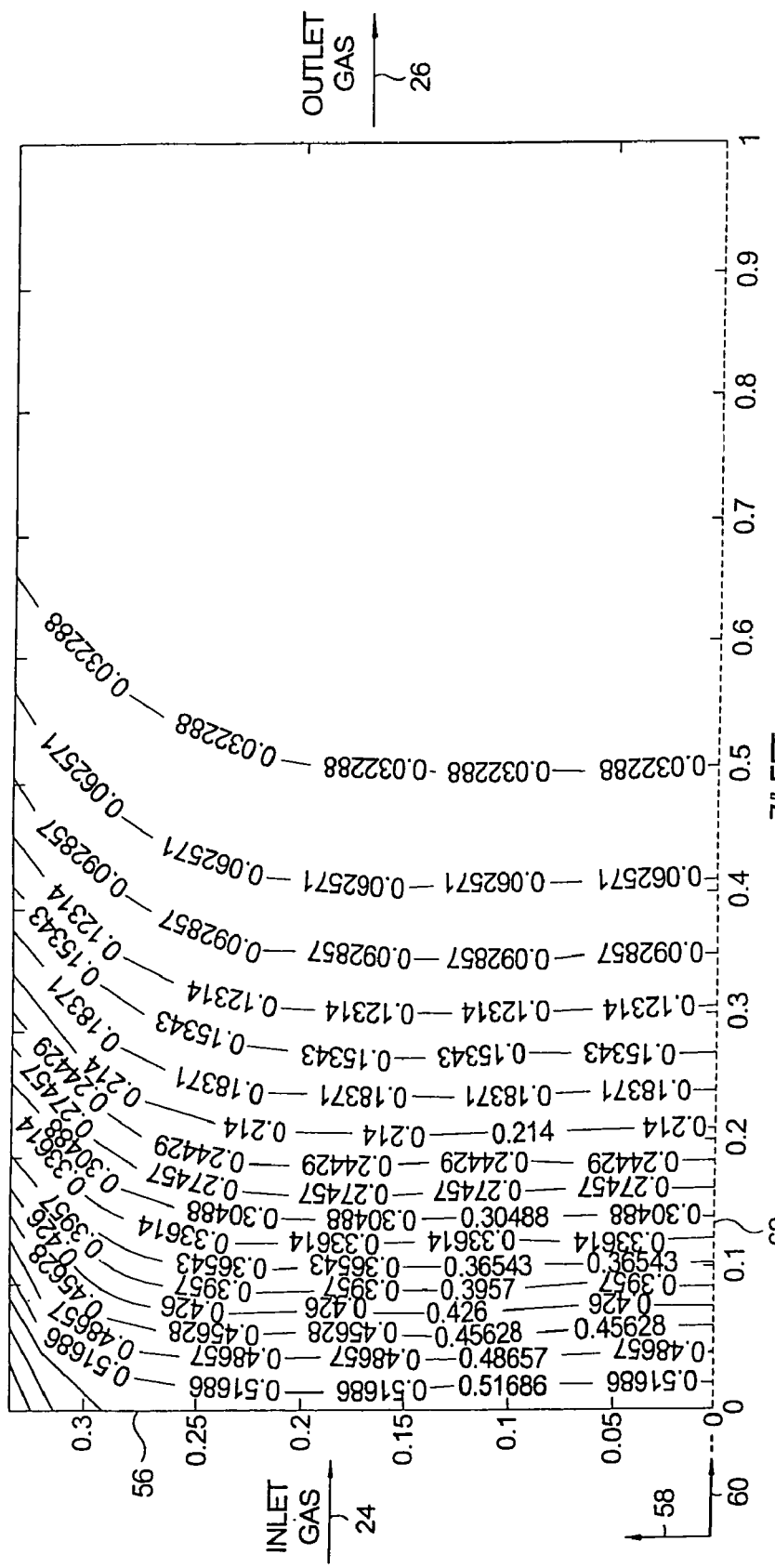
FIG. 6 is a schematic diagram like that shown in FIG. 3, showing residual soot in a CDPF after a two-phase regeneration procedure in accordance with the invention.

Referring to FIG. 6, an exemplary result of performing a two-phase DPF regeneration in accordance with the present invention is shown. The axes 56,62 and DPF directions 58,60 are as previously shown in FIG. 3. It is seen that there is no measurable residual soot in the last half of the DPF, and residual soot in the first half of the DPF is reduced approximately six-fold. Thus, a prior art DPF regenerated in accordance with the invention can have approximately 95% of its filtration capacity restored.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for regeneration of a diesel particulate filter in the stream of exhaust gas from a diesel engine by combusting retained soot in the presence of oxygen and injected diesel fuel in the exhaust gas stream being passed through said diesel particulate filter, comprising the steps of:
   a) warming-up diesel particulate filter by injecting excess fuel and increase oxygen content in the stream of exhaust gas to a level sufficient to cause combustion of accumulated soot at the inlet to diesel particulate filter;
   b) performing a first phase regeneration beginning at a first diesel particulate filter inlet temperature, a first oxygen percentage with respect to said exhaust gas, and a first diesel fuel injection rate; and
   c) performing a second phase regeneration beginning at a second diesel particulate filter inlet temperature, a second oxygen percentage with respect to said exhaust gas, and a second diesel fuel injection rate.

2. A method in accordance with claim 1 wherein said first diesel particulate filter inlet temperature is about 600° C.

3. A method in accordance with claim 2 wherein said first oxygen percentage is about 4%.

4. A method in accordance with claim 1 wherein said second diesel particulate filter inlet temperature is about 650° C.

5. A method in accordance with claim 4 wherein said second oxygen percentage is about 8%.

6. A method for regeneration of a diesel particulate filter in the stream of exhaust gas from a diesel engine by combusting retained soot in the presence of oxygen and diesel fuel in the exhaust gas stream passed through said diesel particulate filter, comprising the steps of:
   a) initiate primary regeneration by adjusting and then controlling inlet temperature of said diesel particulate filter to about 600° C. and the oxygen concentration in said exhaust gas to about 4% until outlet temperature of said diesel particulate filter begins to decrease; and
   b) initiate secondary regeneration by adjusting and then controlling said inlet temperature of said diesel particulate filter to about 650° C. and said oxygen concentration in said exhaust gas to about 8% until said outlet temperature of said diesel particulate filter again begins to decrease.

7. A method in accordance with claim 6 comprising the further steps of:
   a) reducing said diesel particulate filter inlet temperature to about 600° C. while maintaining said oxygen concentration at 8% until a calculated time limit is exceeded; and
   b) returning all engine management controls to their normal states.

8. A method in accordance with claim 6 wherein said adjusting and then controlling steps are carried out by controlling addition rates of oxygen and diesel fuel to said exhaust gas stream.

\* \* \* \* \*